(12) United States Patent
Nomura et al.

(10) Patent No.: US 8,302,429 B2
(45) Date of Patent: Nov. 6, 2012

(54) METHOD AND APPARATUS FOR BENDING A GLASS SHEET

(75) Inventors: Ken Nomura, Chiyoda-ku (JP); Nozomi Otsubo, Chiyoda-ku (JP); Hideki Muramatsu, Chiyoda-ku (JP); Toshimitsu Sato, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 506 days.

(21) Appl. No.: 12/401,094

(22) Filed: Mar. 10, 2009

(65) Prior Publication Data

US 2009/0229309 A1 Sep. 17, 2009

(30) Foreign Application Priority Data

Mar. 14, 2008 (JP) ................................. 2008-066700

(51) Int. Cl.
*C03B 23/02* (2006.01)
*C03B 23/023* (2006.01)
(52) U.S. Cl. .......................................... 65/106; 65/273
(58) Field of Classification Search ............... 65/106, 65/273
See application file for complete search history.

(56) References Cited

U.S. PATENT DOCUMENTS

| | | | |
|---|---|---|---|
| 4,095,968 A * | 6/1978 | Bristow | ............... 65/104 |
| 4,123,246 A | 10/1978 | Johnson | |
| 4,556,406 A | 12/1985 | Kahle | |
| 6,363,753 B1 * | 4/2002 | Yoshizawa et al. | ............... 65/287 |
| 6,397,634 B1 | 6/2002 | Takeda et al. | |
| 6,843,074 B2 | 1/2005 | Nemugaki et al. | |
| 7,401,477 B2 | 7/2008 | Inoue et al. | |
| 2005/0000247 A1 | 1/2005 | Yoshizawa | |
| 2005/0061032 A1* | 3/2005 | Yoshizawa | ............... 65/106 |
| 2006/0144090 A1 | 7/2006 | Yoshizawa | |

(Continued)

FOREIGN PATENT DOCUMENTS

JP 10-203840 8/1998

(Continued)

OTHER PUBLICATIONS

Office Action dated Nov. 22, 2011 issued in Japanese Patent Application No. 2008-066700 (with English translation).

*Primary Examiner* — Matthew Daniels
*Assistant Examiner* — Cynthia Szewczyk
(74) *Attorney, Agent, or Firm* — Oblon, Spivak, McClelland, Maier & Neustadt, L.L.P.

(57) ABSTRACT

The present invention relates to a method and an apparatus for bending a glass sheet, and has an object of achieving high forming accuracy of a glass sheet along a perpendicular direction perpendicular to a conveying direction of the glass sheet, in particular, to obtain high forming accuracy both along the conveying direction and the perpendicular direction.

An apparatus 10 for bending a glass sheet for bending a heated glass sheet G while the glass sheet G is conveyed in a conveying direction X by a roller conveyer 18, 20 comprising a plurality of conveying rollers; the apparatus 10 comprising a plurality of straight rollers that are arranged upper and lower positions across a conveying surface for the glass sheet G and not curved on the conveying surface, and a plurality of curving rollers 36 arranged upper and lower positions across the conveying surface for the glass sheet G on adjacently downstream side of the straight rollers 34 and curvable along a perpendicular direction Y in the conveying surface so as to bend the glass sheet G along the perpendicular direction Y.

27 Claims, 4 Drawing Sheets

U.S. PATENT DOCUMENTS

2006/0179885 A1 * 8/2006 Reunamaki et al. ............ 65/104

FOREIGN PATENT DOCUMENTS

| | | |
|---|---|---|
| JP | 2000-169167 | 6/2000 |
| JP | 2004-508264 | 3/2004 |
| JP | 2005-179124 | 7/2005 |
| WO | WO 2008/155455 A1 | 12/2008 |
| WO | WO 2008/155459 A1 | 12/2008 |

* cited by examiner

Fig. 2
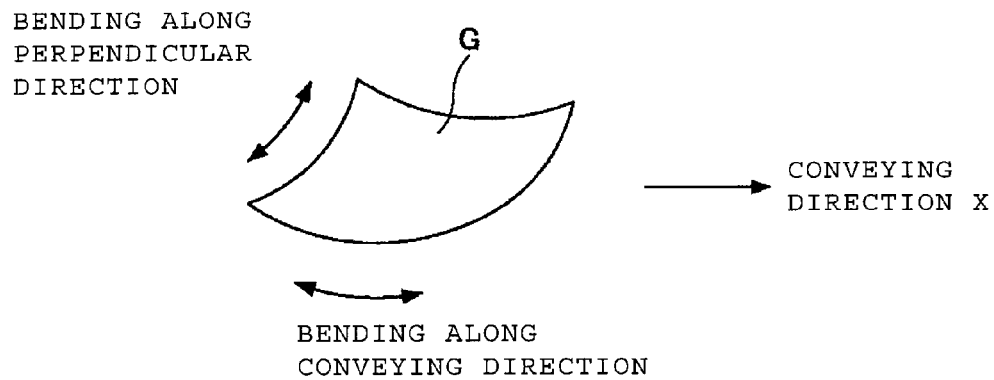
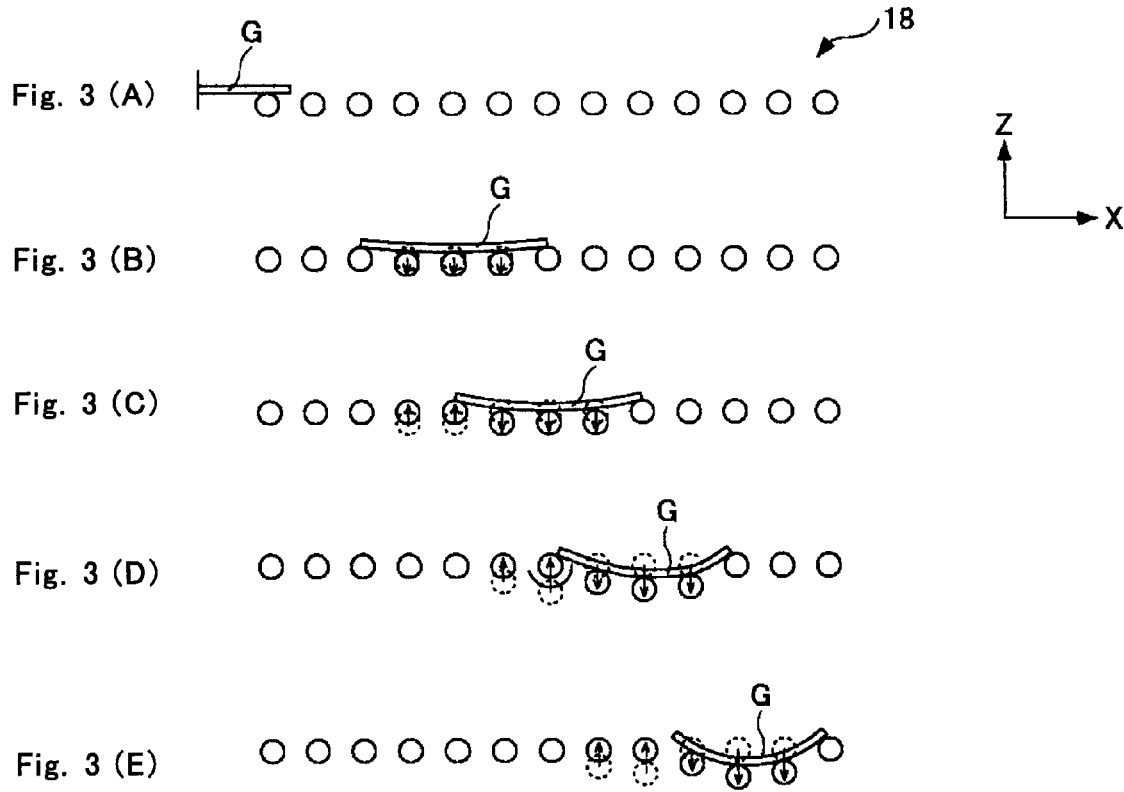

BENDING ALONG
CONVEYING
DIRECTION

BENDING ALONG
PERPENDICULAR
DIRECTION

METHOD AND APPARATUS FOR BENDING A GLASS SHEET

TECHNICAL FIELD

The present invention relates to a method and an apparatus for bending a glass sheet, in particular, to a method of bending a heated glass sheet along a conveying direction and thereafter bending the glass sheet along a perpendicular direction perpendicular to the conveying direction, and to an apparatus for such a method.

BACKGROUND ART

Heretofore, a technique for bending a glass sheet heated at a temperature at which bending is possible is bent into a desired curvature, is known (refer to e.g. JP-A-2005-179124). In this technique, a heated glass sheet is conveyed by a roller conveyer constituted by a plurality of conveying rollers forming a conveying surface, and the conveying rollers are each moved up and down according to the conveyance of the glass sheet, to thereby form a curved surface for bending the glass sheet along the conveying direction on the conveying surface. In this case, the glass sheet is bent in the conveying direction by its own weight so as to fit to the curved surface formed on the conveying surface while the glass sheet is conveyed on the roller conveyer. Accordingly, it is possible to bend the glass sheet into a desired curvature along the conveying direction by up-down movements of the conveying rollers.

Further, in the above technique, after the glass sheet is bent along the conveying direction by the above technique, the glass sheet is conveyed by curving rollers each having an axis curved along a perpendicular direction perpendicular to the conveying direction, during which a heated compressed air is blown from air blowing means to the glass sheet. In this case, the glass sheet is pressed against the curving rollers by the heated compressed air while the glass sheet is conveyed by the curving rollers, whereby the glass sheet is bent along the perpendicular direction perpendicular to the conveying direction. Accordingly, by the wind pressure of air blowing, the glass sheet can be bent into a desired curvature along the perpendicular direction perpendicular to the conveying direction.

DISCLOSURE OF THE INVENTION

Problems to be Solved by the Invention

However, in the above technique of JP-A-2005-179124 in which the bending of a glass sheet, that has been bent along a conveying direction, along a perpendicular direction perpendicular to the conveying direction is achieved by applying a pressure to the glass sheet by blowing an air, when the air is blown to press the glass sheet against curving rollers, only the end portions in the perpendicular direction of the glass sheet contact with the curving rollers, and the central portion in the perpendicular direction of the glass sheet does not contact with the curving rollers. Accordingly, the glass sheet is not only bent into this shape but at the same time, the glass sheet that has already been bent along the conveying direction may be further deformed into a bow shape along the conveying direction since its upstream side end and downstream side end in the conveying direction are pressed down by the air, and as a result, the bending accuracy of the glass sheet may be deteriorated.

The present invention is made considering the above points, and it is an object of the present invention to provide a method and an apparatus for bending a glass sheet, which are capable of obtaining high forming accuracy along the conveying direction and a perpendicular direction perpendicular to the conveying direction.

Means for Solving the Problems

The above object is achieved by a method for bending a glass sheet comprising a forming step of bending a heated glass sheet while it is conveyed by a roller conveyer comprising a plurality of conveying rollers, wherein the forming step comprises a conveying direction forming step of bending the glass sheet along the conveying direction, and a perpendicular direction forming step of bending the glass sheet along the perpendicular direction by employing at least one lower forming roller constituting the roller conveyer and an upper forming roller disposed above the lower forming roller, that are curving rollers curved along a perpendicular direction perpendicular to the conveying direction on a conveying surface, and nipping the glass sheet, that has been bent along the conveying direction in the conveying direction forming step, by the lower and upper forming rollers while the glass sheet is conveyed.

Further, the above object is achieved by an apparatus for bending a glass sheet, comprising a roller conveyer comprising a plurality of conveying rollers for conveying a heated glass sheet; a lower forming roller constituting at least a part of the roller conveyer, and an upper forming roller disposed above the lower forming roller, that are disposed upper and lower positions of the glass sheet so as to nip and bend the glass sheet; the apparatus further comprising conveying direction forming means for bending the glass sheet along the conveying direction; wherein the lower forming roller and the upper forming roller are each a curving roller curved along the perpendicular direction on the conveying surface, and the upper forming roller and the lower forming roller are disposed upper and lower positions on the downstream side in the conveying direction of the conveying direction forming means so that they can nip the glass sheet that has been bent along the conveying direction by the conveying direction forming means.

In the invention of these embodiments, a glass sheet is bent along the conveying direction first, and the glass sheet bent along the conveying direction is conveyed on the conveying surface as it is nipped by an under forming roller and an upper forming roller that are curving rollers curved along a perpendicular direction perpendicular to the conveying direction, whereby the glass sheet is bent along the perpendicular direction.

According to this construction, a glass sheet is bent along the conveying direction first, and while the curved shape along the conveying direction is maintained, the glass sheet is nipped by upper and lower curving rollers to thereby be bent along the perpendicular direction. Namely, the bending along the perpendicular direction is achieved by forcefully restricting the glass sheet by the curving rollers and pressing the glass sheet against a curved shape of the curving rollers while the curved shape along the conveying direction is maintained.

Further, the direction of conveyance of glass sheet is determined so that the curvature along the conveying direction becomes larger than the curvature along the perpendicular direction at the time of forming. Namely, if bending along the direction perpendicular to the conveying direction is performed first, geometric rigidity increases, and the glass sheet can not be sufficiently bent along the conveying direction requiring large forming amount and the forming accuracy becomes insufficient in some cases, but when bending along the conveying direction requiring large forming amount is performed first with high accuracy and thereafter bending along the perpendicular direction is carried out, it is possible to obtain high shape accuracy. Further, by performing bending along the conveying direction requiring large forming amount first, forming amounts along the conveying direction and the perpendicular direction become close when the glass sheet is bent by being nipped by curving rollers in the subsequent step, e.g. a wrinkle hardly occurs even if the glass sheet is bent by being nipped by the curving rollers, and the forming accuracy of the glass sheet is significantly improved. Accordingly, according to the present invention, as compared with a case of bending a glass sheet along the conveying direction and perpendicular direction at the same time or a case of pressing a glass sheet against curving rollers by a heated air, it is possible to obtain high forming accuracy both along the conveying direction of glass sheet and a perpendicular direction perpendicular to the conveying direction.

Here, in the method for bending a glass sheet, the construction may be such that the conveying direction forming step includes an up-down movement forming step of moving each of the conveying rollers up and down in the perpendicular direction, thereby forming a predetermined curved surface for bending the glass sheet along the conveying direction on a conveying surface, and placing the glass sheet on the curved surface while the curved surface is moved in the conveying direction in synchronism with the movement of the glass sheet in the conveying direction to thereby bend the glass sheet along the conveying direction by own weight of the glass sheet. Further, in the apparatus for bending a glass sheet, the construction may be such that the conveying direction forming means comprises roller driving means for moving up and down each conveying roller in the vertical direction, and roller control means for controlling the roller driving means so as to form a predetermined curved surface for bending the glass sheet along the conveying direction by own weight of the glass sheet on the conveying surface, and to move the curved surface in the conveying direction in synchronism with movement of the glass sheet in the conveying direction while the glass sheet is placed on the curved surface.

In the invention of these embodiments, each conveying roller moves up and down to form a curved surface having a predetermined curvature on a conveying surface, and when a glass sheet is placed on the curved surface, the glass sheet is bent in a conveying direction by its own weight. Here, also lower forming roller(s) and upper forming roller(s) each moves up and down to form a curved shape having a predetermined curvature along the conveying direction, whereby the curved shape along the conveying direction can be maintained with high accuracy. As an alternative, the glass sheet is forcefully pressed by a lower forming roller, an adjacent roller and an upper forming roller, whereby the curved shape along the conveying direction can be adjusted. According to such a construction, without a complicating equipment, it is possible to realize bending of a glass sheet along the conveying direction while the glass sheet is conveyed, and further, bending of the glass sheet along the perpendicular direction can also be achieved while the glass sheet is conveyed. Accordingly, according to the present invention, while high forming accuracy is maintained both along the conveying direction and the perpendicular direction, it is possible to achieve high productivity.

Further, in the method for bending a glass sheet, the bending by the up-down movement forming step may be carried out in a high temperature atmosphere in a furnace. Further, in the apparatus for bending a glass sheet, the conveying rollers each moves up and down by the roller driving means may be disposed in a high temperature atmosphere in a furnace.

In the invention of these embodiments, a glass sheet is bent along the conveying direction as it is heated. By the way, at a time of producing a tempered glass, it is necessary to temper a glass sheet by air cooling after it is formed, and in order to perform the tempering by air cooling, the temperature of the glass sheet needs to be high. However, since bending of the glass sheet by rollers is usually carried out outside of a furnace and the temperature of the glass sheet may drop during the forming, a desired tempered glass may not be obtained. To solve this problem, in the construction of the present invention, bending of a glass sheet in the conveying direction is carried out as the glass sheet is heated, and it is possible to prevent drop of the temperature of glass sheet during forming and to perform tempering of the glass sheet by air cooling under appropriate conditions.

Further, in the method for bending a glass sheet, the perpendicular direction forming step is a step of bending the glass sheet along the perpendicular direction by employing the lower forming roller and the upper forming roller disposed above a space between the lower forming roller and an adjacent roller, and pressing down by the upper forming roller a region of the glass sheet between portions supported by the lower forming roller and the adjacent roller while the glass sheet is conveyed. Further, in the apparatus for bending a glass sheet, the upper forming roller may be disposed above a space between the lower forming roller and an adjacent roller.

In the invention of this embodiment, a lower forming roller and an upper forming roller that are curving rollers curved along a perpendicular direction perpendicular to the conveying direction are employed, and a heated glass sheet is conveyed on a conveying surface while a region of the glass sheet between portions supported by the lower forming roller and an adjacent roller is pressed down by the upper forming roller, whereby the glass sheet is bent along the perpendicular direction.

According to such a construction, a glass sheet is bent along the conveying direction first, and while the curved shape along the conveying direction is maintained, it is nipped by upper and lower curving rollers, whereby the glass sheet is bent along the perpendicular direction. Namely, bending along the perpendicular direction is achieved by forcefully restricting the glass sheet by curving rollers, and while the curved shape along the conveying direction is maintained, the heated glass sheet is nipped by upper and lower curving rollers so that the glass sheet is bent along a curved shape of the curving rollers, whereby the glass sheet is bent along the perpendicular direction. In this step, while the glass sheet is forcefully restricted by the lower forming roller, the adjacent roller and the upper forming roller, a region of the glass sheet between portions supported by the lower forming roller and the adjacent roller is pressed against a curved shape of the upper forming roller above a space between the lower forming roller and the adjacent roller, whereby the bending is achieved.

In this step, the upper roller is disposed above a space between lower rollers, and the region of the glass sheet between the lower rollers is pushed down by the upper forming roller to be bent. By the way, if the lower forming roller and the upper forming roller are disposed so as to be opposed to each other, it is difficult to produce a bending moment efficiently in the region between the lower forming rollers, the upper forming roller may need to push down as it is moved laterally along the curvature of the glass sheet, whereby the apparatus or the control system may become complicated. On the other hand, in the construction of the present invention, the upper forming roller pushes down a region between the lower forming rollers, whereby it is possible to produce a bending moment efficiently in the glass sheet, and to bend the glass sheet with high accuracy. This construction is preferred since a bending moment is efficiently produced by up-down movement of the forming roller. Accordingly, it is possible to reduce the number of upper forming rollers, and to obtain high forming accuracy along the perpendicular direction with simple construction.

Further, in the above method for bending a glass sheet, the perpendicular direction forming step may be a step of bending a glass sheet along a perpendicular direction perpendicular to the conveying direction by employing at least two said lower forming rollers and said upper forming roller disposed above a space between the lower forming rollers, and pressing down by the upper forming roller a region of the glass sheet between portions supported by the lower forming rollers while the glass sheet is conveyed. Further, in the above apparatus for bending a glass sheet, the construction may be such that the lower forming rollers include at least two curving rollers, and the upper forming roller is disposed above a space between the lower forming rollers.

In the invention of this embodiment, an upper forming roller is disposed above a space between two curved lower forming rollers, and a region of a glass sheet between the lower forming rollers is pressed down by the upper forming roller, to be bent. Since the glass sheet is bent while it is forcefully restricted by three curving rollers, it is possible to produce a bending moment to bend the glass sheet along the perpendicular direction efficiently, and it is possible to bend the glass sheet with high accuracy.

Further, in the method for bending a glass sheet, the conveying direction forming step may include a straight roller forming step of bending the glass sheet along the conveying direction by employing at least one lower auxiliary forming roller disposed on the upstream side in the conveying direction of the lower forming roller constituting the roller conveyer, and an upper auxiliary forming roller disposed above the lower auxiliary forming roller, that are straight rollers not curved on the conveying surface, and nipping the glass sheet by the lower and upper auxiliary forming rollers on a curved surface formed on the roller conveyer while the glass sheet is conveyed. Further, in the apparatus for bending a glass sheet, the construction may be such that the conveying direction forming means includes at least one lower auxiliary forming roller disposed on the upstream side of the lower forming roller constituting the roller conveyer and an upper auxiliary forming roller, that are straight rollers not curved on the conveying surface, and the upper auxiliary forming roller and the lower auxiliary forming roller are disposed upper and lower positions so as to nip the glass sheet on the curved surface formed on the roller conveyer.

According to the invention of these embodiments, a heated glass sheet is conveyed while it is nipped by an upper auxiliary forming roller and a lower auxiliary forming roller, that are straight rollers arranged upper and lower positions along a curved shape in the conveying direction, whereby the glass sheet is bent along the conveying direction.

According to such a construction, a glass sheet is first nipped by upper and lower straight rollers to be forcefully pressed, whereby the glass sheet can be securely formed into a desired shape or a shape close to the desired shape along the conveying direction, and it becomes possible to improve the forming accuracy of the glass sheet. Namely, particularly in a case where the bending amount along the conveying direction is larger than that along the perpendicular direction, bending along the conveying direction is completed first, whereby it is possible to reduce the forming amount of the glass sheet in a subsequent step of bending the glass sheet along the perpendicular direction by upper and lower curving rollers, e.g. a wrinkle hardly occurs in the glass sheet, and it is possible to obtain high forming accuracy both along the conveying direction and the perpendicular direction.

Further, in the method for bending a glass sheet, the conveying direction forming step may include a straight roller forming step of bending the glass sheet along the conveying direction by employing at least one lower auxiliary forming roller disposed in the upstream side in the conveying direction of the lower forming roller constituting the roller conveyer, and an upper auxiliary forming roller disposed above a space between the lower auxiliary forming roller and an adjacent roller, that are straight rollers not curved on the conveying surface, and pressing down by the upper auxiliary forming roller a region of the glass sheet between portions supported by the lower auxiliary forming roller and the adjacent roller while the glass sheet is conveyed. Further, in the apparatus for bending a glass sheet, the construction may be such that the conveying direction forming means includes at least one lower auxiliary forming roller disposed on the upstream side of the lower forming roller constituting the roller conveyer and an upper auxiliary forming roller, that are straight rollers not curved on the conveying surface, and the upper auxiliary forming roller is disposed above a space between the lower auxiliary forming roller and an adjacent roller.

According to the invention of these embodiments, a heated glass sheet is nipped by upper and lower straight rollers disposed along a curved shape along the conveying direction, whereby the glass sheet is bent along the conveying direction. In this step, a region of the glass sheet between portions supported by a lower auxiliary forming roller and an adjacent roller, is forcefully restricted by the lower auxiliary forming roller, the adjacent roller and an upper auxiliary forming roller, and the glass sheet is pressed by the upper auxiliary forming roller disposed above a space between the lower auxiliary forming roller and the adjacent roller, whereby the glass sheet is bent along a curved direction along the conveying direction in which the upper and lower straight rollers are arranged. According to this construction, the upper auxiliary forming roller is disposed above a space between lower forming rollers, and the region of the glass sheet between the lower rollers is pressed down by the upper auxiliary forming roller, whereby the glass sheet is bent. Accordingly, it is possible to produce a bending moment in the glass sheet efficiently, and to bend the glass sheet with high accuracy. Further, if the upper auxiliary forming roller moves up and down, the bending moment can be produced efficiently, such being preferred. Accordingly, it is possible to reduce the number of upper auxiliary forming rollers, and to maintain high forming accuracy along the perpendicular direction by simple construction.

Further, in the method for bending a glass sheet, the conveying direction forming step may include a straight roller forming step of bending the glass sheet along the conveying direction by employing at least two lower auxiliary forming rollers disposed on the upstream side in the conveying direction of the lower forming roller constituting the roller conveyer and an upper auxiliary forming roller disposed above a space between the lower auxiliary forming rollers, that are straight rollers not curved on the conveying surface, and pressing down by the upper auxiliary forming roller a region of the glass sheet between positions supported by the lower auxiliary forming rollers while the glass sheet is conveyed. Further, in the apparatus for bending a glass sheet, the construction may be such that the conveying direction forming means comprises at least two lower auxiliary forming rollers and an upper auxiliary forming roller that are disposed on an upstream side in the conveying direction from the lower forming roller forming the roller conveyer, and that are non-curved straight rollers disposed on the conveying surface, wherein the upper auxiliary forming roller is disposed above a space between the lower auxiliary forming rollers so as to nip the glass sheet on the curved surface formed by the roller conveyer.

In the invention of this embodiment, the upper auxiliary forming roller is disposed a space between two lower auxiliary forming rollers, and a region of a glass sheet between the two lower auxiliary forming rollers is pressed down by the upper auxiliary forming rollers, whereby the glass sheet is bent. Since the bending is carried out while the glass sheet is forcefully restricted by three straight rollers arranged along a curved shape along the conveying direction, it is possible to produce a bending moment along the conveying direction in the glass sheet efficiently, and to bend the glass sheet with high accuracy.

By the way, in the method for bending a glass sheet, the perpendicular direction forming step may include a step of bending a glass sheet along the perpendicular direction by employing the lower auxiliary forming roller, the lower forming roller, and an upper forming roller disposed above a space between the lower auxiliary forming roller and the lower forming roller, and pressing down by the upper forming roller a region of the glass sheet between portions supported by the lower auxiliary forming roller and the lower forming roller while the glass sheet is conveyed. Further, in the apparatus for bending a glass sheet, the upper forming roller is disposed above a space between the lower auxiliary forming roller and the lower forming roller.

Namely, the construction may be such that the lower auxiliary forming rollers include at least two above-mentioned straight rollers, the lower forming rollers includes at least two above-mentioned curving rollers, the upper auxiliary forming roller includes at least one above-mentioned straight roller, the upper forming rollers include at least two above-mentioned curving rollers, and upper rollers are each disposed above a space between lower rollers.

In the invention of this embodiment, the upper auxiliary forming roller, that is a straight roller, is disposed above a space between two lower auxiliary forming rollers that are straight rollers, and upper forming rollers, that are curving rollers, are disposed above a space between two lower forming rollers, that are curving rollers, and above a space between a lower forming roller and an adjacent straight roller, respectively. Then, first, a portion of a glass sheet between two lower auxiliary forming rollers is pressed down by the upper auxiliary roller, whereby the glass sheet is securely bent along the conveying direction. Next, a region of the glass sheet between two lower forming rollers and a region of the glass sheet between the lower forming roller and an adjacent straight roller are pressed down by respective upper forming rollers, whereby the glass sheet is securely bent along a perpendicular direction perpendicular to the conveying direction. In such a construction, it is possible to reduce the number of forming rollers to simplify the apparatus, and to secure high forming accuracy both along the conveying direction and the perpendicular direction.

Further, in the method for bending a glass sheet, the perpendicular direction forming step may include a curvature changing step of changing a curvature along the perpendicular direction of at least one curving roller in the lower forming roller and the upper forming roller during bending of the glass sheet. Further, the apparatus for bending a glass sheet may comprise a curvature changing means for changing a curvature along the perpendicular direction of at least one curving roller in the lower forming roller and the upper forming roller.

In the invention of the embodiment, during forming of a glass sheet, curvature of upper and lower curving rollers for bending the glass sheet along the perpendicular direction can be optionally changed, whereby it is possible to bend a glass sheet having a curvature of the perpendicular direction changing along the conveying direction. Accordingly, according to the present invention, in the step of bending of a glass sheet along a perpendicular direction perpendicular to the conveying direction, curvature of curving rollers can be optionally changed at an appropriate timing during pass of each glass sheet according to a shape required for each glass, whereby it is possible to produce even a glass sheet having a desired shape along the perpendicular direction changing along the conveying direction.

Further, the curvatures along the perpendicular direction of upper end lower curving rollers for bending a glass sheet along the perpendicular direction, are changeable by curvature changing means. In this case, the curvature along the perpendicular direction of the glass sheet to be bent along the perpendicular direction can be optionally changed. Accordingly, according to the present invention, bending of a glass sheet along the perpendicular direction perpendicular to the conveying direction can be carried out by appropriately changing the curvatures of curving rollers according to the shape required for each glass sheet, and accordingly, even various glass sheets having different desired shapes along the perpendicular direction can be each appropriately bent along the perpendicular direction without exchanging the curving rollers. Accordingly, change of the shape to which the glass sheet is formed does not require exchange of curving rollers and only requires change of setting of an apparatus, whereby it is possible to significantly reduce time for job change, and to improve productivity.

Here, in these inventions, "bend (be bent) along the conveying direction" means to form a shape of a glass sheet into a curved shape around a horizontal axis perpendicular to the conveying direction. Namely, a glass sheet bent along the conveying direction has a curved shape in a cross section in parallel with the conveying direction. Further, "bend (is bent) along the perpendicular direction perpendicular to the conveying direction" means to form the shape of a glass sheet into a curved shape around an axis parallel with the conveying direction. Namely, a glass sheet bent along the perpendicular direction perpendicular to the conveying direction has a curved shape in a cross section parallel with a direction perpendicular to the conveying direction.

Further, "curve (is curved) along the perpendicular direction" means to curve an axis of a curving roller around an axis parallel with the conveying direction. Further, "upper" and "lower" mean "upper" and "lower" with respect to a horizontal plane.

Effects of the Invention

According to the present invention, it is possible to secure high forming accuracy of a glass sheet along a conveying direction of the glass sheet and along a perpendicular direction perpendicular to the conveying direction.

BRIEF EXPLANATION OF THE DRAWINGS

FIG. 2: A view showing the direction of bending of glass sheet G.

FIG. 3: A transition view of bending operation of a glass sheet G along the conveying direction by a roller conveyer employed in the bending apparatus of this example.

BEST MODE FOR CARRYING OUT THE INVENTION

From now, specific embodiments of the method and apparatus for bending a glass sheet according to the present invention will be described with reference to drawings.

Figure 1:
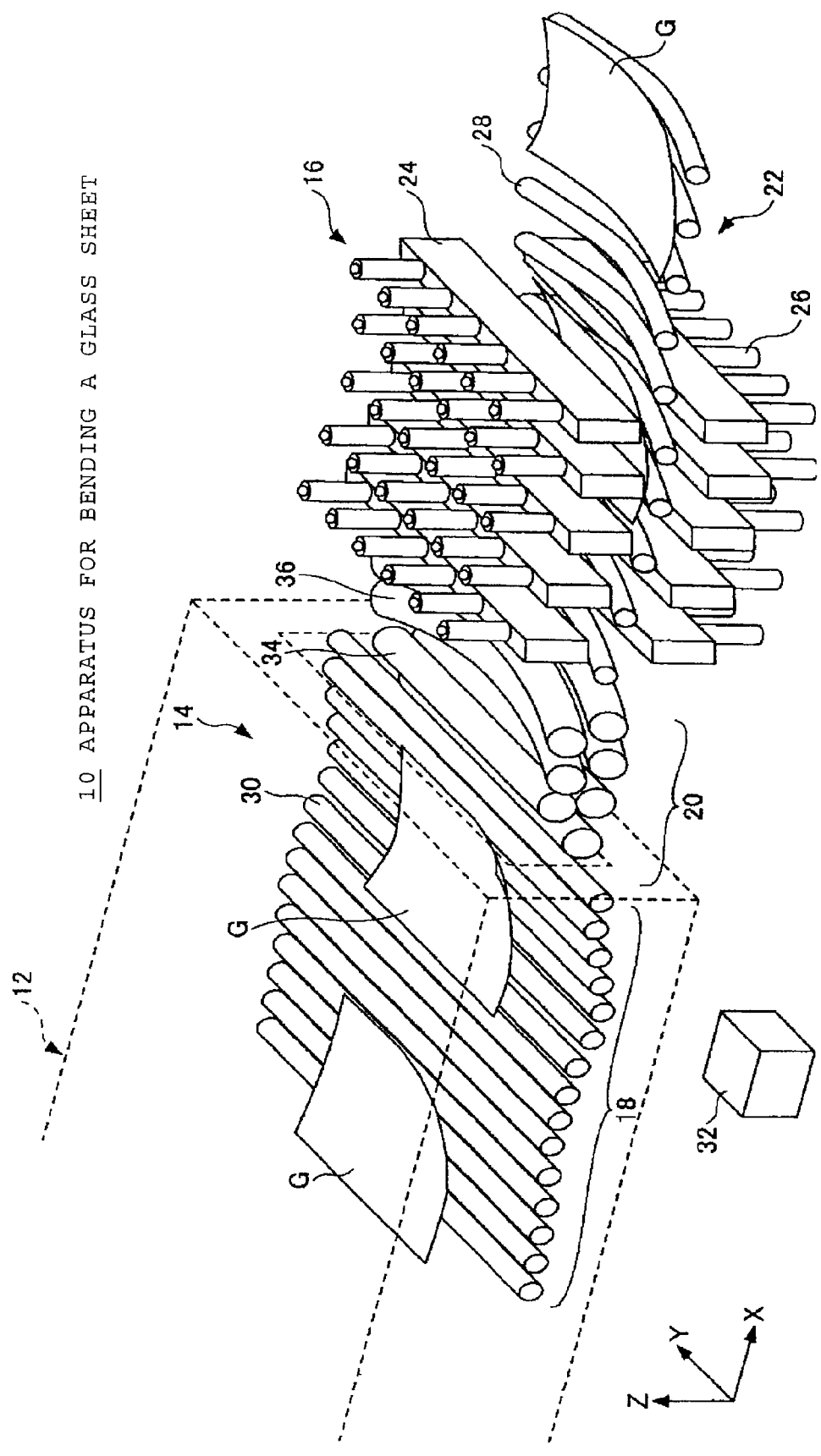
FIG. 1: A perspective view of an apparatus for bending a glass sheet of an example of the present invention.

FIG. 1 is a perspective view showing an apparatus 10 for bending a glass sheet G as an example of the present invention. Further, FIG. 2 is a view showing the direction of bending the glass sheet G. The apparatus 10 for bending of this example is an apparatus for bending a glass sheet G to be used for a transportation equipment such as an automobile or a train or for a building, along two directions (along a conveying direction X and a perpendicular direction Y perpendicular to the conveying direction X, that are to be described later) to form a complex curved surface.

As shown in FIG. 1, an apparatus 10 for bending of this example comprises a heating furnace 12, a forming unit 14 and an air cooling tempering unit 16. The heating furnace and the forming unit 16 are disposed so that the glass sheet G passes these unit in this order when it is conveyed. Here, in this example, a part of the forming unit 14 is disposed in the heating furnace 14. Further, the forming unit 14 and the air cooling tempering unit 16 are disposed so that the glass sheet G passes through these units in this order when it is conveyed.

The heating furnace 12 has a heater and the heater heats the glass sheet G conveyed horizontally by a conveyer. The forming unit 14 has roller conveyers 18 and 20, and bends the glass sheet G conveyed by the roller conveyers 18 and 20. The roller conveyers 18 and 20 are disposed so as to adjacent to each other so that the roller conveyer 18 is disposed on the upstream side and the roller conveyer 20 is disposed on the downstream side. Further, the roller conveyer 20 is disposed on the upstream side of the air cooling tempering unit 16.

Further, the air cooling tempering unit 16 has a roller conveyer 22 and nozzle heads 24 and 26 disposed upper and lower positions so as to nip the roller conveyer 22, and a glass sheet G conveyed by the roller conveyer 22 is tempered by air-cooling by air blown from the nozzle heads 24 and 26. Here, the cooling capacity of the air cooling tempering unit 16 is appropriately selected depending on the material or the thickness of the glass sheet G.

The roller conveyer 22 in the air cooling tempering unit 16 has a curving roller 28 having an axis curved into a downward convex shape along a perpendicular direction perpendicular to a conveying direction X of the glass sheet G. A plurality of such curving rollers 28 are provided, they are arranged in parallel at predetermined intervals in the conveying direction X of the glass sheet G, and form a conveying surface for conveying the glass sheet G having a desired shape along the conveying direction X. Here, the intervals of adjacent curving rollers 28 in the conveying direction X are, for example, determined so that a glass sheet G is supported by four curving rollers 28.

Next, a process flow of bending a glass sheet G in the apparatus 10 for bending of this example will be described.

In this example, a flat plate-shaped glass sheet G cut into a predetermined shape is placed on an upstream portion of a conveyer in the entrance of a furnace 12, positioned, and conveyed by the conveyer into the heating furnace 12. Then, the glass sheet G is heated by a heater while it is conveyed in the heating furnace 12, to a temperature at which bending by a bending unit 14 is possible (e.g. about 600° C. to 700° C.).

The glass sheet G heated in the heating furnace 12 is conveyed to the bending unit 14 by a roller conveyer 18. Then, the glass sheet G is, as to be described in detail, while it is conveyed in the bending unit 14, the glass sheet is bent along the conveying direction X by bending operation by the roller conveyer 18, the glass sheet is bent along the conveying direction and it is bent along a horizontal direction (hereinafter referred to as perpendicular direction) Y perpendicular to the conveying direction by bending operation by a roller conveyer 20.

The glass sheet G bent in the forming unit 14 is conveyed by the roller conveyer 22 into an air cooling tempering unit 16 disposed on the downstream side of the forming unit 14. Then, the glass sheet G is tempered by air cooling by air blown from nozzle heads 24 and 26 while the glass sheet is conveyed in the air cooling tempering unit 16. The glass sheet G tempered by air cooling in the air cooling tempering unit 16, is conveyed from its exit to an inspection apparatus of subsequent step by a roller conveyer.

Next, a method for bending by a roller conveyer 18 in the forming unit 14 of this example, will be described. FIG. 3 is a transition view of bending operation of a glass sheet G by the roller conveyer 18 of the forming unit 14 of this example. Here, FIG. 3 is a view of the roller conveyer 18 observed from a lateral direction.

In this example, the roller conveyer of the forming unit 14 has a plurality of conveying rollers 30 each having an axis linearly extending in a horizontal perpendicular direction Y perpendicular to the conveying direction X of the glass sheet. The conveying rollers 30 are disposed in a heating furnace 12. Each of the conveying rollers 30 is supported by a frame of the roller conveyer 18 so as to be rotational, and has a constant radius from the axis center of the roller regardless of position in the axis direction. The plurality of conveying rollers 30 are arranged at predetermined intervals along the conveying direction X of glass sheet G, so as to form a conveying surface for conveying the glass sheet G in the conveying direction X. Here, the intervals between adjacent conveying rollers 30 in the conveying direction X are, for example, determined so that a glass sheet G is supported by four conveying rollers 30.

Each conveying roller 30 performs rotation driving around an axis, and it is movable in an up-down direction Z perpendicular to the conveying direction X of glass sheet G. Rotation drive of each conveying roller 30 is carried out independently, and up-down movement of each conveying roller is also carried out independently.

To each conveying roller 30, a servomotor for rotating the conveying roller 30 is connected. Each conveying roller 30 is rotated independently by drive of a corresponding servomotor.

Further, each conveying roller 30 is supported by a frame of the roller conveyer so as to be movable in up-down direction Z. Up-down movement of each conveying roller 30 is achieved by up-down movement of movable frame capable of moving in up-down direction in relation to a fixed frame. To the fixed frame, servomotors for moving respective conveying rollers 30 in up-down direction perpendicular to the conveying direction are fixed. The axis of each servomotor is connected to a corresponding movable frame. Each movable frame moves in up-down direction independently by a corresponding servomotor, so as to move a corresponding conveying roller 30 in up-down direction.

In this example, the forming unit 14 has a controller 32. The controller 32 detects enter of a glass sheet G into the forming unit 14 by means of e.g. a photoelectric sensor, and calculate the conveying position of the glass sheet G by means of e.g. a pulse generator after the detection of enter. Then, according to data required for bending the glass sheet G into a desired curvature along the conveying direction memorized in advance, up-down movement of the conveying rollers 30 are each controlled according to the conveying position of the glass sheet G calculated above, and rotations of the conveying rollers 30 are each controlled according to the up-down position of the conveying roller 30.

In the above construction, when the glass sheet G is not conveyed in the forming unit 14, the conveying rollers 30 are all at the uppermost position, and the conveying surface formed by the plurality of conveying rollers 30 is horizontally flat (FIG. 3(A)). Then, when the glass sheet G is conveyed into the forming unit 14, moving down and up of the conveying rollers 30 are sequentially carried out from the upstream side according to conveyance of the glass sheet G. In this case, at the beginning of conveyance, a plurality of conveying rollers 30 move down to form a conveying surface curved in a downward convex form, and thereafter, a plurality of conveying rollers 30 repeatedly move up and down to thereby move the curve of the conveying surface in the conveying direction X. As the conveyance of glass sheet G progresses, descent amount of conveying roller 30 increases to thereby decrease the curvature radius of curved surface in the conveying surface (FIGS. 3(B) to 3(E)).

Each conveying roller 30 in the forming unit 14 performs one cycle of up-down movement at each time a glass sheet G is conveyed, according to passage of the glass sheet G. At this time, a downward convex-form curved surface is formed by a plurality of conveying rollers 30, and the curved surface moves in the conveying direction X according to conveyance of the glass sheet G. Then, during this progress, front end and rear end of the glass sheet G in the conveying direction are maintained at a normal conveying level, and the central portion in the conveying direction drops downwardly from the regular conveying level according to the descent position of conveying roller. Here, since it is necessary to increase curvature of the glass sheet G as it progresses to the downstream side, the amplitude of conveying surface, that is the amplitude of up-down movement of conveying roller 30, increases toward downstream side.

When the conveying surface is curved by up-down movement of the conveying rollers 30 of the roller conveyer 18, a glass sheet G conveyed is bent downwardly along a curved surface of the conveying rollers 30 formed into a shape along the curved surface while the glass sheet G moves in the conveying direction X on the curving rollers 30. Then, the glass sheet G is bent more deeply downward as it is conveyed, and bent along the conveying direction X.

Figure 4:
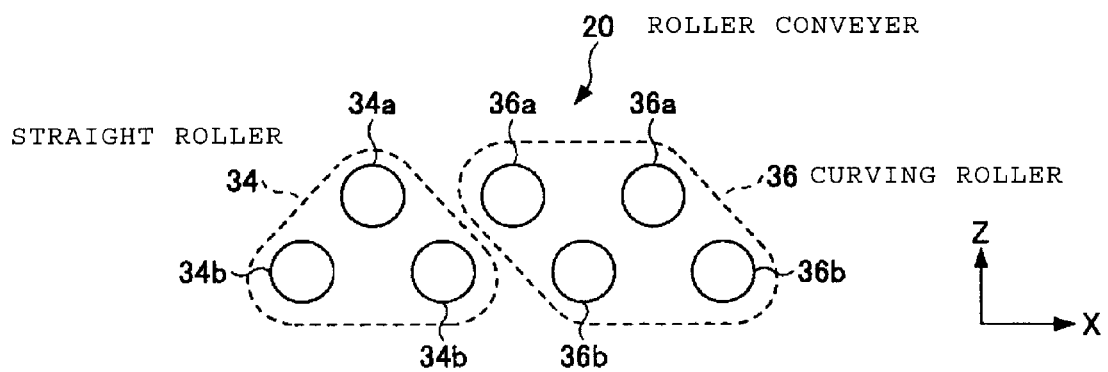
FIG. 4: A construction view of a main part of a roller conveyer employed in the bending apparatus of this example.
Figure 5:
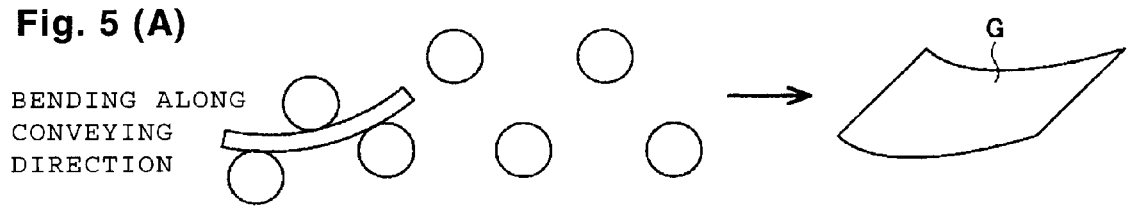
FIG. 5: A view for explaining a bending operation of glass sheet G by a roller conveyer employed in the bending apparatus of this example.
Figure 5:
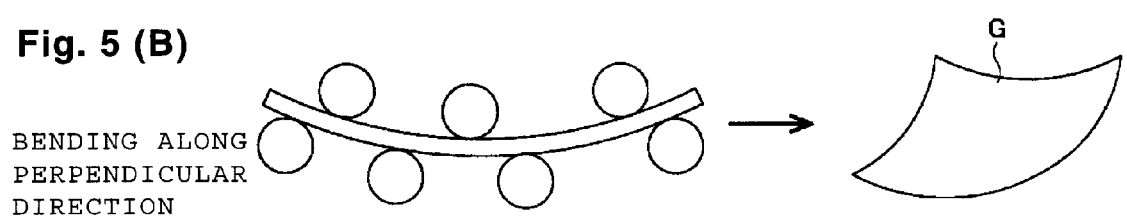
Figure 6:
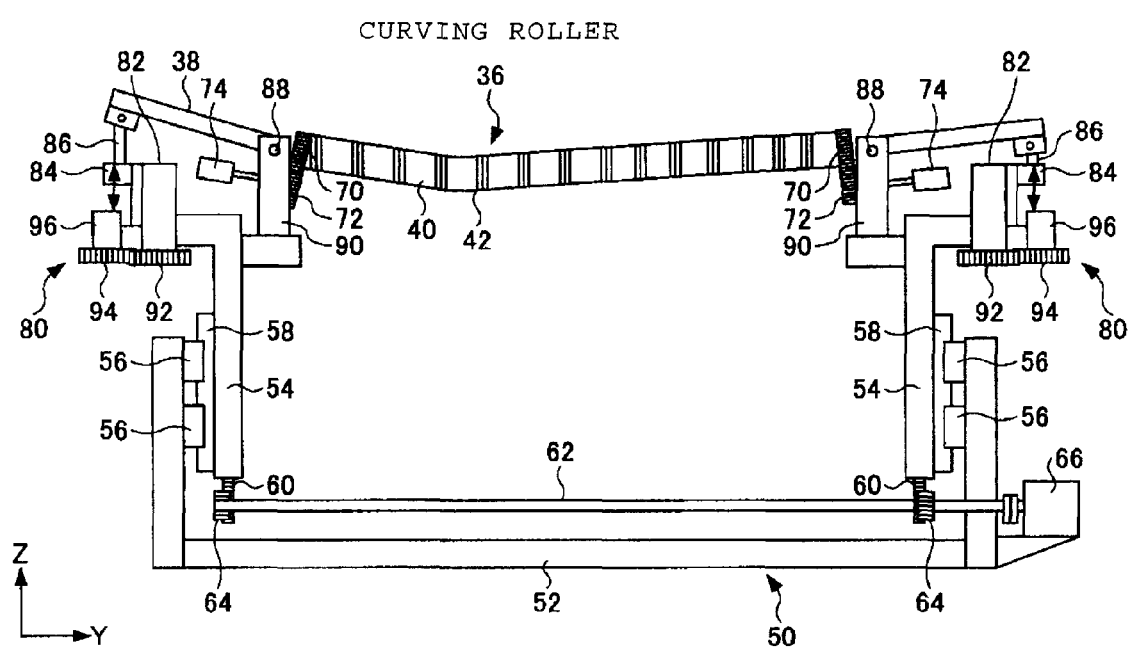
FIG. 6: A construction view of a roller conveyer employed in the bending apparatus of this example.

Next, a method for bending by using a roller conveyer 20 in the bending unit 14 is described. FIG. 4 is a construction view of a main portion of the roller conveyer 20 in the forming unit of this example. Here, FIG. 4 is a view observed from a side direction of the roller conveyer 20. FIG. 5 is a view for explaining a bending operation of a glass sheet G by the roller conveyer 20 of the forming unit 14 of this example. Further, FIG. 6 is a construction view of the roller conveyer 20 of the forming unit 14 of this example. Here, FIG. 6 is a view of a curving roller portion of the roller conveyer 20 observed in the conveying direction, but a straight roller portion has substantially the same construction except for curve-forming apparatus.

In this example, the roller conveyer 20 of the forming unit 14 has straight rollers 34 each having an axis straightly extending in a perpendicular direction Y perpendicular to the conveying direction X of glass sheet G, which is not curved in the conveying surface, and curving rollers 36 adjacently downstream side of the straight rollers 34, each having an axis extending in the perpendicular direction Y perpendicular to the conveying direction X of glass sheet G and curving into a downward convex form, that is, curved to downward direction perpendicular to the conveying direction X in the conveying surface. The straight rollers 34 and the curving rollers 36 each has a shaft diameter larger than those of the conveying rollers 30 of the roller conveyer 18 so as to have higher rigidity than those of the conveying rollers 30. The straight rollers 34 and the curving rollers 36 are each formed to have a constant radius from the axial center regardless of the position in the axis direction.

A plurality of straight rollers 34 are provided, and specifically, they include one upper straight roller 34a provided upper side and two lower straight rollers 34b provided underside so that a conveying surface for glass sheet G is nipped by these upper and lower straight rollers. Further, a plurality of curving rollers 36 are provided, and specifically, they include two upper curving rollers 36a provided upper side and two lower curving rollers 36b provided on lower side so that the conveying surface for glass sheet G is nipped between upper and lower curving rollers.

The two lower straight rollers 34b and the two lower curving rollers 36b are arranged at predetermined intervals in the conveying direction X of glass sheet G at substantially the same height as that of e.g. other portion of the roller conveyer 18, to form a conveying surface for conveying a glass sheet G in the conveying direction X. Further, the one upper straight roller 34a and the two upper curving rollers 36a are arranged at predetermined intervals in the conveying direction X of glass sheet at a height higher by about the thickness of glass sheet G above the height of the lower straight rollers 34b and 36b. Here, intervals between adjacent lower rollers 34b and 36b in the conveying direction X are determined so that, for example, a glass sheet G is supported by four lower rollers 34b and 36b, and the intervals between adjacent upper rollers 34a and 36b in the conveying direction X is determined in the same manner.

The upper straight roller 34a and the lower straight rollers 34b are not disposed so as to oppose to each other across the conveying surface for glass sheet G but disposed so as to shift in the conveying direction X from each other, and further, the upper curving rollers 36a and the lower curving rollers 36b are not disposed so as to oppose to each other across the conveying surface for glass sheet G but disposed so as to shift in the conveying direction X from each other, and a downstream side lower straight roller 34b among the two lower straight rollers 34b and an upstream side upper curving roller 36a of the two upper curving rollers 36a are not disposed so as to oppose to each other across the conveying surface for glass sheet G but they are disposed so as to shift in the conveying direction X. Namely, upper rollers 34a and 36 are all disposed above respective spaces between two adjacent lower rollers 34b and 36b.

The straight rollers 34 each has a shaft having a straight rod shape. To this shaft, a hollow ring roller is fit. Further, the curving rollers 36 each has a flexible shaft 38 made of an elastic flexible material and having a rod shape. To the flexible shaft 38, a plurality of ring rollers 40 are fit. These plurality of ring rollers 40 are connected each other via flexible tubular members 42 each provided between adjacent ring rollers, to constitute a hollow roller structure.

Straight rollers 34 and curving rollers 36 are each supported by a frame of roller conveyer 20 so as to be movable in up-down direction. Specifically, to each of the rollers 34 and 36, an elevating device 50 is attached. The elevating device 50 has sliders 54 supported at respective ends in the horizontal direction Y perpendicular to the conveying direction of glass sheet G so as to be movable up and down with respect to a fixed frame 52. Each slider 54 has a guide rail 58 slidably engaged with a guide block 56 attached to the fixed frame 52.

The slider 54 is provided with a rack 60 so as to project downwardly from a lower portion of the slider 54. The rack 60 is engaged with a pinion 64 attached to a rotational shaft 62 extending in the horizontal direction Y perpendicular to the conveying direction X. The rotational shaft 62 is borne at both ends in the horizontal direction Y so as to be rotational, and one of the ends is connected with a shaft of servomotor 66. The rotational shaft 62 is rotated by the servomotor 66, and propagates the rotational force to the pinion 64.

To the servomotor 66, the above-mentioned controller 32 is electrically connected. The controller 32 drives the servomotor 66 so that all rollers 34 and 36 each moves up and down to form a local deep curved portion in a predetermined portion of a glass sheet G being conveyed. Specifically, according to data required for bending a glass sheet G of a model that is being conveyed, into desired curvatures along the conveying direction X and the perpendicular direction Y, that is memorized in advance, up-down movement of each of the straight rollers 34 and the curving rollers 36 are controlled according to the conveying position of the glass sheet G being conveyed.

Thus, when the servomotor 66 is driven, rotational force of the rotational shaft 62 is propagated to the pinion 64, and by conversion function between the pinion 64 and the rack 60, the force is transformed into linear movement of the rack 60. In this case, the slider 54 is moved up and down according to linear movement of the rack 60, whereby a corresponding straight roller 34 or curving roller 36 moves up and down.

Further, the straight rollers 34 and the curving rollers 36 are each supported by a frame of the roller conveyer 20 so as to be rotatable. Specifically, to the ring rollers of each of the rollers 34 and 36, a ring gear 70 is fixed. To the ring gear 70, a gear 72 is engaged. To the gear 72, a shaft of a servomotor 74 is connected. The gear 72 is rotated by drive of the servomotor 74, and propagates the rotational force to the ring gear 70.

To the servomotor 74, the above-mentioned controller 32 is electrically connected. The controller 32 drives the servomotor 74 so that each of the rollers 34 and 36 rotates at a proper speed. Specifically, according to data required for bending a glass sheet G of a model being conveyed, into a desired curvatures along the conveying direction and the perpendicular direction, that is memorized in advance, rotational drive of each of the straight rollers 34 and the curving rollers 36 is controlled according to up-down position of each of the rollers 34 and 36 based on the conveying position of the glass sheet G being conveyed.

Thus, when the servomotor 74 is driven, the rotational force of the gear 72 is propagated to the ring gear 70, and consequently a ring roller of a corresponding roller 34 or 36 is rotated around a shaft. Each of the rollers 34 and 36 is independently rotated by drive of corresponding servomotor 74.

Further, to each of the curving rollers 36, a curve-forming device 80 is attached. The curve-forming device 80 is connected to each end of a flexible shaft 38 of the curving roller 36. The curve-forming device 80 has a lead screw portion 82 attached and fixed to the slider 54. To the lead screw portion 82, a slider 84 is attached so as to be movable in the up-down direction. The lead screw portion 82 and the slider 84 are screwed with each other in a relation between a volt and a nut.

To the slider 84, a flexible shaft 38 is connected so as to be swingable via a bar 86. The flexible shaft 38 is connected to a supporting plate 90 fixed to a slider 54 so as to be swingable about a pin 88 as a fulcrum. Accordingly, both ends of the flexible shaft 38 of the curving roller 36 is pushed upwardly or pulled downwardly by up-down movement of the slider 84 around the pin 88 as a fulcrum, to be tilted from horizontal, whereby the flexible shaft 38 is curved downwardly.

To the lead screw portion 82, a gear 92 is attached, and with the gear 92, a gear 94 is engaged. To the gear 94, a shaft of a servomotor 96 fixed to the slider 54 is connected. The gear 94 is rotated by drive of the servomotor 96, and propagates the rotational force to the lead screw portion 82 via the gear 92.

To the servomotor 96, the above-mentioned controller 32 is electrically connected. The controller 32 drives the servomotor 96 so that each curving roller 36 is curved downwardly with a desired angle. Specifically, according to data required for bending a glass sheet G of a model being conveyed, into a desired curvature along the perpendicular direction Y, that is memorized in advance, the angle of curve of each curving roller 36 is controlled according to the conveying position of glass sheet G calculated.

Thus, when the servomotor 96 is driven, the rotational force is propagated to the lead screw portion 82 via the gears 94 and 92, and by the conversion function between the lead screw portion 82 and the slider 84, the rotational force is transformed into up-down movement of the slider 84. In this case, both ends of the flexible shaft 38 is moved upwardly or downwardly, whereby the corresponding curving roller 36 curved downwardly with an angle determined by the height of both ends.

In the above construction, when a glass sheet G is bent along the conveying direction by up-down movement of a plurality of conveying rollers 30 of the forming unit 14, then, first, a plurality of straight rollers 34 disposed upper and lower positions across the conveying surface for glass sheet G are rotated by drive of servomotors 74, whereby the glass sheet G is moved (conveyed) in the conveying direction X. At the time of this conveyance, these upper and lower straight rollers 34 are each moved up and down by a servomotor 66 in accordance with the shape of glass sheet G that is already bent along the conveying direction X, whereby a predetermined position of the glass sheet G is bent along the conveying direction X while the glass sheet G is nipped (three point bending). Accordingly, the glass sheet G is bent along the conveying direction X by being nipped by upper and lower straight rollers 34 while it is moved in the conveying direction on the straight rollers 34.

Further, when the glass sheet G passes through the straight rollers 34, next, a plurality of curving rollers 36 disposed upper and lower positions across the conveying surface for glass sheet G are each rotated by drive of a servomotor 74, whereby the glass sheet G is moved (conveyed) in the conveying direction X. At the time of this conveyance, these upper and lower curving rollers 36 are each moved up and down by drive of a servomotor 66 according to the shape of the glass sheet G and bent appropriately along the perpendicular direction Y by drive of a servomotor 96, whereby a predetermined position of the glass sheet G is bent along a perpendicular direction Y perpendicular to the conveying direction X while the glass sheet G is nipped, or else, in addition to the bending along the perpendicular direction Y, the glass sheet G is further bent along the conveying direction X to adjust the curved shape along the conveying direction X.

Accordingly, while the glass sheet G is moved on curving rollers 36 in the conveying direction X, it is nipped by upper and lower curving rollers 36, whereby the glass sheet is bent along the perpendicular Y perpendicular to the conveying direction X, or else, it is further bent along the conveying direction X for adjusting curved shape at the same time.

Here, into the forming unit 14 of this example, a plurality of glass sheets G are sequentially and continuously conveyed one after another, and a plurality of glass sheets G are bent in parallel according to the respective conveying positions in the forming unit 14. Namely, the conveying rollers 30 in the forming unit 14 each repeats up-down movement to bend glass sheets conveyed one after another along the conveying direction X, and at the same time, the straight rollers 34 and the curving rollers 36 each repeats up-down movement and curving so as to bend along the conveying direction X and the perpendicular direction Y glass sheets G conveyed one after another.

Thus, according to the forming unit 14 of this example, a plurality of conveying rollers 30 are moved up and down in synchronism with conveyance of a glass sheet G to form a curved surface on a roller conveying surface, and while the glass sheet G is placed in the curved surface, the curved surface is moved in the conveying direction in synchronism with the movement of glass sheet G in the conveying direction, whereby the glass sheet G is bent along the conveying direction X by its own weight while the glass sheet is conveyed in the conveying direction. Further, by moving up and down upper and lower straight rollers 34 in synchronism with conveyance of the glass sheet G so as to nip the glass sheet G, it is possible to bend the glass sheet G along the conveying direction X by the nipping by the straight rollers 34. Further, the upper end lower curving rollers 36 are curved into a predetermined curvature angle and moved up and down in synchronism with the conveyance of the glass sheet G so as to nip the glass sheet G, whereby the glass sheet G is bent along the perpendicular direction Y perpendicular to the conveying direction X by nipping by the curving rollers 36, or else, the glass sheet G is further bent along the conveying direction X.

In such a construction, bending of a glass sheet G along the conveying direction X is, first, achieved by using the own weight of the glass sheet G by up down movement of a plurality of conveying rollers 30, and next, the bending is achieved by applying a pressure by the nip of the glass sheet G by straight rollers 34 with up-down movement of upper and lower straight rollers 34. According to such a bending method, high accuracy of curved shape of the glass sheet G along the conveying direction X can be maintained, or else, fine adjustment of the curved shape along the conveying direction X is possible. According to this feature, it becomes possible to realize high accuracy of bending of the glass sheet along the conveying direction X while the glass sheet G is conveyed without complicating the equipment, whereby it is possible to maintain high productivity while high forming accuracy of the glass sheet G along the conveying direction X is maintained.

Further, in the above construction, bending of the glass sheet G along the perpendicular direction Y is realized by conveying the glass sheet G while it is nipped by upper and lower curving rollers 36 that are each curved along the perpendicular direction Y perpendicular to the conveying direction X. Namely, this bending along the perpendicular direction is realized by forcefully restricting the glass sheet G by the upper and lower curving rollers 36, and pressing the glass sheet against the curved shape of the curving rollers 36 while the curved shape along the conveying direction is maintained. According to the bending method along the perpendicular direction Y, it is possible to carry out bending along the perpendicular direction Y while the curved shape along the conveying direction X formed before the bending along the perpendicular direction Y is maintained, or else to carry out bending along the perpendicular direction Y while further carrying out bending along the conveying direction X at the same time.

Further, in the forming unit 14 of this example, the direction of conveyance of glass sheet G is determined so that a desired curvature along the conveying direction X becomes larger than a desired curvature along the perpendicular direction Y when desired curvatures along these directions are compared. This is because when bending along the conveying direction X requiring larger forming amount is carried out first, in a subsequent step of forming the glass sheet along the perpendicular direction Y requiring smaller forming amount by being nipped by curving rollers 36, the forming amounts along the conveying direction X and the perpendicular Y become close, and even if the glass sheet is bent by being nipped by the curving rollers 36, e.g. a wrinkle is hardly formed and the forming accuracy of the glass sheet G significantly improves.

In this point, in this example, it is possible to avoid drastic bending of a glass sheet G along the conveying direction X when the glass sheet G is bent along the perpendicular direction Y. Accordingly, according to the apparatus for bending of this example, it becomes possible to obtain high forming accuracy both along the conveying direction X of the glass sheet and along the perpendicular direction Y perpendicular to the conveying direction X, and to securely form the glass sheet G into a desired shape. Further, on the contrary, it is not necessary to suppress a curved shape along the perpendicular direction Y shallow to suppress deformation of the glass sheet along the conveying direction X, and accordingly, it becomes possible to achieve deeply curved shape along the perpendicular direction Y.

Further, in the above-mentioned construction, before the glass sheet G is bent along the perpendicular direction Y perpendicular to the conveying direction X by being nipped between upper and lower curving rollers 36, the glass sheet G is bent along the conveying direction by being nipped by upper and lower straight rollers 34. When bending of the glass sheet G along the conveying direction X is carried out by forcefully applying a pressure by the nip by the straight rollers 34, it is possible to easily and securely make the bent shape of the glass sheet G along the conveying direction X a desired shape or a shape close to the desired shape.

In this point, when bending along the conveying direction X requiring larger bending amount is substantially completed before bending along the perpendicular direction Y, in a subsequent step of bending along the perpendicular direction Y by curving rollers 36, it becomes possible to reduce the forming amount of a glass sheet G, and accordingly, e.g. a wrinkle is hardly formed on the glass sheet G. Accordingly, according to the apparatus 10 for bending in this example, it is possible to improve forming accuracy of a glass sheet G along the conveying direction X, and as a result, it becomes possible to bend along the perpendicular direction Y a glass sheet that has been formed along the conveying direction X with high accuracy, while the desired curved shape along the conveying direction X is maintained.

Further, in the above construction, straight rollers 34 and curving rollers 36 for bending a glass sheet G along the conveying direction X and the perpendicular direction Y are arranged at upper and lower positions across the conveying surface for the glass sheet G, and the upper and lower rollers 34, 36 are not arranged at the same positions in the conveying direction X so as to be opposed to each other in the vertical direction so that they are right above and right under positions from each other, but they are arranged so that they are shifted in the conveying direction X from each other across the conveying surface for glass sheet G (refer to FIG. 5). Namely, upper rollers 34a, 36a are each disposed above a space between adjacent two lower rollers 34b, 36b.

If the upper and lower rollers 34, 36 are opposed to each other in the vertical direction, it becomes difficult to efficiently produce a bending moment in a region between two adjacent 34b, 36b in a step of bending a glass sheet G being conveyed, and as a result, it becomes necessary to push down the upper rollers 34a, 36a as it is shifted in lateral direction along the curvature of the glass sheet G, whereby the apparatus or the control system may be complicated.

On the other hand, in the construction like this example in which an upper roller 34a, 36a is disposed above a space between adjacent two lower rollers 34b, 36b, a region of a glass sheet G being conveyed between two adjacent lower rollers 34b, 36b is pressed by the upper roller 34a, 36a, and accordingly, it becomes possible to efficiently produce a bending moment in the glass sheet G, and to bend the glass sheet G with high accuracy by up-down movement of the lower roller 34a, 36a.

Further, if the upper and lower rollers 34, 36 are arranged so as to be opposed to each other in the vertical direction, it becomes necessary to employ at least three pairs of upper and lower rollers 34, 36 (namely, six rollers in total of upper and lower rollers) to bend a predetermined portion of the glass sheet G. On the other hand, in a construction like this example in which an upper roller 34a, 36a is disposed above a space between two adjacent lower rollers 34b, 36b, it is sufficient that at least three rollers 34, 36 in total of upper and lower rollers are required to bend a predetermined portion of a glass sheet G.

Further, in the construction of this example, an upper straight roller 34a is disposed above a space between two lower straight rollers 34b, and upper curving rollers 36a are disposed above a space between two lower curving rollers 36b and above a space between a lower curving roller 36b (most upstream side) and an adjacent lower straight roller 34b (most downstream side), respectively. Then, when a region between the two lower straight rollers 34b is pressed down by the upper straight roller 34a, the glass sheet G is securely bent along the conveying direction. Next, a region between the lower curving roller 36b (most upstream side) and an adjacent lower straight roller 34b (most downstream side) and a region between two lower curving rollers 36b, are pressed down by respective upper curving rollers 36a, whereby the glass sheet G is securely bent along the perpendicular direction Y perpendicular to the conveying direction X.

Accordingly, according to the apparatus 10 for bending of this example, it becomes possible to reduce the number of upper and lower straight rollers 34 and curving rollers 36 required for bending a glass sheet G along the conveying direction X and the perpendicular direction Y, whereby it becomes possible to realize bending of a glass sheet G with simple construction, and further, it becomes possible to shorten the length of the forming unit 14 in the conveying direction. Further, as a result, it becomes possible to achieve high forming accuracy both along the conveying direction and the perpendicular direction while the numbers of lower rollers 34b, 36b and upper rollers 34a, 36a are reduced to simplify the apparatus.

In this example, a glass sheet G is bent along the conveying direction X and the perpendicular direction Y perpendicular to the conveying direction X by the forming unit 14, and a part of the forming unit 14, namely conveying rollers 30 moving up and down are disposed in the heating furnace 12 (refer to FIG. 1). In this respect, bending of a glass sheet G along the conveying direction X by up-down movement of a plurality of conveying rollers 30 is carried out at the same time with heating of the glass sheet G by the heating furnace 12. Accordingly, when the glass sheet G is bent in the conveying direction X by up-down movement of conveying rollers 30, it is possible to prevent the temperature drop of the glass sheet G, whereby it becomes possible to perform air cooling tempering of the glass sheet G under proper conditions to produce a tempered glass.

Further, in this example, up-down movement of each conveying roller 30, up-down movement of each straight roller 34 and up-down movement and curving of each curving roller 34, are each realized optionally and freely by a corresponding servomotor 66, 96 driven by a controller 32. In this respect, by control of the controller 32, a start timing and operation amount of up-down movement and operation amount of curved angle of each roller 30, 34, 36 are appropriately changed, whereby it is possible to bend a glass sheet of different model, it is possible to omit exchange work of each roller 30, 34, 36 for carrying out bending of each glass sheet G, it becomes possible to substantially omit job change time, and it becomes possible to improve productivity. Further, by appropriately changing operation amounts of up-down movement or curvature radius of each roller 30, 34, 36 by control of the controller 32, it is possible not only to bend a glass sheet G into a curved shape having a single curvature radius, but also to bend the glass sheet G into a complex curved surface in which a plurality of curvature radiuses are conjugated, whereby it is possible to produce a glass sheet G having different desired shapes between the conveying direction X and the perpendicular direction Y by appropriately bending the glass sheet along the conveying direction X and the perpendicular direction Y without exchanging the curving rollers 36 themselves.

Here, in the above example, bending of a glass sheet G along the conveying direction X by the forming unit 14 corresponds to "forming step", "conveying direction forming step" and "conveying direction forming means", and bending of a glass sheet G along a perpendicular direction Y perpendicular to the conveying direction X by the forming unit 14 corresponds to "forming step" and "perpendicular direction forming step" described in the claims. Further, particularly, bending of a glass sheet G along the conveying direction X by up-down movement of conveying rollers 30 of the forming unit 14 corresponds to "up-down movement forming step", "roller driving means" and "roller controlling means" described in the claims, and bending of a glass sheet G along the conveying direction X by nipping it by straight rollers 34 of the forming unit 14 corresponds to "straight roller forming step" described in the claims.

Further, in the above example, the curving roller 36 of the roller conveyer 20 corresponds to "curving roller" described in the claims, the lower straight roller 34b corresponds to "lower auxiliary forming roller" described in the claims, the lower curving roller 36b corresponds to "lower forming roller" described in the claims, upper straight roller 34a corresponds to "upper auxiliary forming roller" described in the claims, upper curving roller 36a corresponds to "upper forming roller" described in the claims, and the curvature forming device 80 corresponds to "curvature changing means" described in the claims.

Here, in the above example, three straight rollers 34 in total of upper and lower straight rollers, and four curving rollers 36 in total of upper and lower curving rollers, are provided.

However, if it is not possible to bend a glass sheet along the conveying direction X and the perpendicular direction Y appropriately in such a case that the glass sheet G has small size, at least one straight roller 34 is disposed in the lower position and at least two curving rollers 36 in total of upper and lower curving rollers may be provided. Further, if the glass sheet G has large size or the glass sheet G is required to be bent deeply, more rollers may be provided.

Further, in the above example, the straight rollers 34 and the curving rollers 36 disposed upper and lower positions across the conveying surface for the glass sheet G, are disposed so as to be shifted in the conveying direction X from each other, but the construction may be such that they may be provided at the same positions in the conveying direction X so that they are each right above and right under positions and opposed to each other in the vertical direction, and either upper or lower (preferably upper) rollers 34, 36 may be configured to be swingable so that when a glass sheet is nipped, the upper and lower rollers 34, 36 are substantially shifted from each other in the conveying direction X. In such a modified example, it is possible to reduce the number of rollers 34, 36 of the roller conveyer 20 for bending a glass sheet G along the conveying direction X and the perpendicular direction Y, and accordingly, it is possible to realize bending of the glass sheet G by a simple construction, and to reduce the length of the forming unit 14 in the conveying direction. Here, in such a case where the glass sheet G has small size or a case where the bending amount of glass sheet is small, it is not necessary to configure the rollers 34, 36 swingable in the conveying direction X.

Further, in the above example, up-down movement of straight rollers 34 and curving rollers 36 and curving of the curving rollers are realized by the elevating device 50 and the curvature forming device 80 shown in FIG. 6, but the present invention is not limited thereto, and these function may be realized by other constructions.

Further, in the above example, the conveying rollers 30 of the roller conveyer 18 are moved down first and they are moved up thereafter so that a curved surface of downward convex form is formed on the conveying surface and propagate the curved surface in the conveying direction, but on the contrary, the construction may be such that the conveying rollers 30 are moved up first and moved down thereafter so that a curved surface of upward convex form is formed on the conveying surface and propagate the curved surface in the conveying direction. In this case, axes of the curving rollers 36 of the roller conveyer 20 and axes of the curving rollers 28 of the roller conveyer 22 are curved into upward convex form along the perpendicular direction Y perpendicular to the conveying direction X of glass sheet G.

In the above example, bending of a glass sheet G along the conveying direction is achieved by own weight of the glass sheet while the conveying rollers 30 of the roller conveyer 18 are moved up and down, and further by nipping of the glass sheet G by upper and lower straight rollers 34 or curving rollers 36 while they move up and down. However, the present invention is not limited thereto, and bending of the glass sheet G may be achieved only by own weight of the glass sheet G by employing conveying rollers each moving up and down, or else, it may be achieved by only nipping of the glass sheet G by employing rollers 34, 36 or only rollers 34. Further, the construction may be such that a plurality of conveying rollers arranged in the conveying direction are arranged so that the conveying surface has a curvature along the conveying direction from the default, and bending of glass sheet is achieved by its own weight, and the glass sheet is additionally nipped by rollers. Further, the construction may be such that after a glass sheet is bent along the perpendicular direction by being nipped by curving rollers 36, it is bent again along the conveying direction. The bending along the conveying direction in this case may be achieved by own weight of the glass sheet G by using curving rollers moving up and down, or else, it may be achieved by arranging a plurality of curving rollers so as to form a conveying surface having a radius along the conveying direction. In this step, nipping by curving rollers may be appropriately added.

The entire disclosure of Japanese Patent Application No. 2008-066700 filed on Mar. 14, 2008 including specification, claims, drawings and summary is incorporated herein by reference in its entirety.

What is claimed is:

1. A method for bending a glass sheet comprising:
conveying a heated glass sheet on an upstream portion of a roller conveyer comprising a plurality of upstream conveying rollers forming an upstream conveying surface such that the heated glass is bent along a conveying direction of the roller conveyer; and
conveying the heated glass sheet on a downstream portion of the roller conveyor comprising at least one lower forming roller forming a downstream conveying surface such that the heated glass sheet is nipped between the lower forming roller and an upper forming roller disposed above the lower forming roller and bent along a perpendicular direction with respect to the conveying direction,
wherein the lower forming roller comprises a curving roller which is curved along the perpendicular direction on the downstream conveying surface, the conveying of the heated glass sheet on the upstream portion comprises bending the heated glass sheet along the conveying direction by moving the upstream conveying rollers up and down in synchronism with movement of the heated glass sheet such that the upstream conveying rollers form a curved surface configured to bend the heated glass sheet along the conveying direction on the upstream conveying surface, the heated glass sheet is placed on the curved surface while the curved surface is moved in the conveying direction in synchronism with the movement of the heated glass sheet and the heated glass sheet is bent in the conveying direction by an own weight of the heated glass sheet, the upper forming roller is disposed above a space between the lower forming roller and an adjacent lower forming roller in the roller conveyer, the conveying of the heated glass sheet on the downstream portion of the roller conveyor to bend the heated glass sheet along the perpendicular direction comprises pressing down the upper forming roller on a portion of the heated glass sheet between the lower forming roller and the adjacent lower forming roller, and the conveying of the heated glass sheet on the downstream portion of the roller conveyor further comprises moving the upper forming roller, the lower forming roller, and the adjacent lower forming roller up and down in synchronism with the movement of the heated glass sheet such that the upper forming roller, the lower forming roller, and the adjacent lower forming roller form a curved surface configured to bend the heated glass sheet along the perpendicular direction.

2. The method for bending a glass sheet according to claim 1, wherein the at least one lower forming roller comprises at least two lower forming rollers, said upper forming roller is disposed above the space formed between two of the lower forming rollers, and the upper forming roller is pressed down on the portion of the glass sheet which is between the two of the lower forming rollers while the heated glass sheet is conveyed.

3. The method for bending a glass sheet according to claim 2, wherein the conveying on the upstream portion of the roller conveyor includes bending the heated glass sheet along the conveying direction by employing at least two lower auxiliary forming rollers disposed on an upstream side in the conveying direction of the lower forming roller, and an upper auxiliary forming roller disposed above a space between the lower auxiliary forming rollers, the lower auxiliary forming rollers and upper auxiliary forming roller are straight rollers which are not curved on the upstream conveying surface, and the upper auxiliary forming roller is configured to press down a portion of the heated glass sheet between the lower auxiliary forming rollers while the heated glass sheet is conveyed.

4. The method for bending a glass sheet according to claim 1, wherein the conveying on the upstream portion of the roller conveyor includes bending the heated glass sheet along the conveying direction by employing at least one lower auxiliary forming roller disposed on an upstream side in the conveying direction of the lower forming roller, and an upper auxiliary forming roller disposed above the lower auxiliary forming roller, the lower auxiliary forming roller and upper auxiliary forming roller are straight rollers which are not curved on the upstream conveying surface and configured to nip the heated glass sheet on the curved surface formed on the roller conveyer while the heated glass sheet is conveyed.

5. The method for bending a glass sheet according to claim 4, wherein the at least one lower forming roller comprises a plurality of lower forming rollers which are curving rollers, and the conveying of the heated glass sheet on the downstream portion of the roller conveyor comprising employing at least one straight roller of the straight rollers and at least two curving rollers of the curving rollers.

6. The method for bending a glass sheet according to claim 4, wherein the straight rollers comprise three straight rollers.

7. The method for bending a glass sheet according to claim 4, wherein the straight rollers comprise at least three straight rollers, and the curving rollers comprise at least four curving rollers.

8. The method for bending a glass sheet according to claim 4, further comprising:
    retrieving curvatures of the heated glass sheet along the conveying direction and the perpendicular direction memorized for the heated glass sheet; and
    controlling up-down movements of the upper forming roller, the lower forming roller and the straight rollers in synchronism with the movement of the heated glass sheet such that the heated glass sheet is bent along the conveying direction and the perpendicular direction in accordance with the curvatures retrieved.

9. The method for bending a glass sheet according to claim 1, wherein the conveying on the downstream portion of the roller conveyor includes bending the heated glass sheet along the perpendicular direction by employing a lower auxiliary forming roller, the lower forming roller, and the upper forming roller disposed above the space formed between the lower auxiliary forming roller and the lower forming roller, and the upper forming roller is pressed down on a portion of the heated glass sheet between the lower auxiliary forming roller and the lower forming roller while the heated glass sheet is conveyed.

10. The method for bending a glass sheet according to claim 1, wherein the conveying on the downstream portion of the roller conveyor includes changing a curvature along the perpendicular direction of the curving roller in the lower forming roller and the upper forming roller based on a conveying position of the heated glass sheet during operation.

11. The method for bending a glass sheet according to claim 10, further comprising retrieving a curvature of the heated glass sheet along the perpendicular direction memorized for the heated glass sheet,
    wherein the curvature along the perpendicular direction of the at least one curving roller in the lower forming rollers and the upper forming roller is changed based on the conveying position of the glass sheet during the operation such that an angle of a curve of the curving roller is controlled in accordance with the curvature retrieved.

12. The method for bending a glass sheet according to claim 10, wherein the curvature of the curving roller is changed by a curvature change device connected to each end of a shaft of the curving roller and configured to change the curvature along the perpendicular direction based on the conveying position of the heated glass sheet during operation.

13. The method for bending a glass sheet according to claim 12, wherein the curvature change device comprises a slider and a pin, and the curvature of the curving roller is changed by upwardly pushing or downwardly pulling the end of the shaft of the curving roller by an up-down movement of the slider around the pin as a fulcrum.

14. The method for bending a glass sheet according to claim 1, wherein the at least one lower forming roller comprises a plurality of lower forming rollers which are curving rollers, and the curving rollers comprise at least three curving rollers.

15. The method for bending a glass sheet according to claim 1, further comprising controlling rotations of the upstream conveying rollers independently according to up-down positions of the upstream rollers.

16. The method for bending a glass sheet according to claim 1, further comprising tempering the glass sheet bent along the conveying direction and the perpendicular direction, the tempering comprising conveying the glass sheet on a plurality of curving rollers forming a conveying surface of the glass sheet.

17. An apparatus for bending a glass sheet, comprising:
    a roller conveyer configured to convey a heated glass sheet in a conveying direction and comprising an upstream portion and a downstream portion, the upstream portion comprising a plurality of upstream conveying rollers, the downstream portion comprising a plurality of forming rollers comprising at least one lower forming roller, and an upper forming roller disposed above the lower forming roller, the upstream conveying rollers forming an upstream conveying surface, the lower forming roller forming a downstream conveying surface, the lower forming roller and the upper forming roller being positioned at upper and lower positions of the heated glass sheet and configured to nip and bend the heated glass sheet; and
    a conveying direction forming device configured to bend the glass sheet along the conveying direction,
    wherein the lower forming roller and the upper forming roller are curving rollers curved along the perpendicular direction on the downstream conveying surface, respectively, the conveying direction forming device comprises a roller driving device configured to move the upstream conveying rollers up and down independently in a vertical direction in synchronism with movement of the heated glass sheet and a roller control device configured to control the roller driving device such that a curved surface configured to bend the heated glass sheet along the conveying direction by an own weight of the heated glass sheet on the upstream conveying surface is formed and the curved surface is moved in the conveying direction in synchronism with the movement of the heated glass sheet placed on the curved surface in the conveying direction, the upper forming roller is disposed above a space between the lower forming roller and an adjacent lower forming roller in the roller conveyer, and the upper forming roller, the lower forming roller, and the adjacent lower forming roller are configured to move up and down independently in the vertical direction in synchronism with the movement of the heated glass sheet such that a curved surface configured to bend the heated glass sheet along the perpendicular direction is formed and the curved surface is moved in the conveying direction in synchronism with the movement of the heated glass sheet placed on the downstream conveying surface.

18. The apparatus for bending a glass sheet according to claim 17, wherein the at least one lower forming roller comprises a plurality of lower forming rollers which include at least two curving rollers, and the upper forming roller is disposed above the space formed between the lower forming rollers.

19. The apparatus for bending a glass sheet according to claim 18, wherein the conveying direction forming device includes at least two lower auxiliary forming rollers disposed on an upstream side of the lower forming roller and an upper auxiliary forming roller, the lower auxiliary forming roller and the upper auxiliary forming roller are straight rollers which are not curved on the downstream conveying surface, and the upper auxiliary forming roller is disposed above a space formed between the lower auxiliary forming rollers to nip the heated glass sheet on the curved surface formed on the roller conveyer.

20. The apparatus for bending a glass sheet according to claim 17, wherein the conveying direction forming device includes at least one lower auxiliary forming roller disposed on an upstream side of the lower forming roller and an upper auxiliary forming roller, the lower auxiliary forming roller and the upper auxiliary forming roller are straight rollers which are not curved on the downstream conveying surface, and the upper auxiliary forming roller and the lower auxiliary forming roller are disposed upper and lower positions and configured to nip the heated glass sheet on the curved surface formed on the roller conveyer.

21. The apparatus for bending a glass sheet according to claim 17, wherein the conveying direction forming device includes at least one lower auxiliary forming roller disposed on an upstream side of the lower forming roller and an upper auxiliary forming roller, the lower auxiliary forming roller and the upper auxiliary forming roller are straight rollers which are not curved on the downstream conveying surface, and the upper auxiliary forming roller is disposed above a space formed between the lower auxiliary forming roller and an adjacent lower forming roller.

22. The apparatus for bending a glass sheet according to claim 17, further comprising a curvature change device configured to change a curvature along the perpendicular direction of at least one curving roller in the lower forming rollers and the upper forming roller based on a conveying position of the heated glass sheet during operation.

23. The apparatus for bending a glass sheet according to claim 22, further comprising a controller configured to retrieve a curvature of the heated glass sheet along the perpendicular direction memorized for the heated glass sheet and to control up-down movement of the curving roller,
wherein the curvature change device is configured to change the curvature along the perpendicular direction of the at least one curving roller in the lower forming rollers and the upper forming roller based on the conveying position of the glass sheet such that an angle of a curve of the curving roller is controlled in accordance with the curvature retrieved.

24. The apparatus for bending a glass sheet according to claim 22, wherein the curvature change device is connected to each end of a shaft of the curving roller.

25. The apparatus for bending a glass sheet according to claim 24, wherein the curvature change device comprises a slider and a pin and is configured to change the curvature of the curving roller by upwardly pushing or downwardly pulling the end of the shaft of the curving roller by an up-down movement of the slider around the pin as a fulcrum.

26. The apparatus for bending a glass sheet according to claim 17, further comprising a tempering device configured to temper the glass sheet bent along the conveying direction and the perpendicular direction, the tempering device comprising a plurality of curving rollers configured to form a conveying surface of the glass sheet.

27. The apparatus for bending a glass sheet according to claim 17, further comprising a controller configured to retrieve curvatures of the heated glass sheet along the conveying direction and the perpendicular direction memorized for the heated glass sheet and to control up-down movements of the upper forming roller, the lower forming roller and the straight rollers in synchronism with the movement of the heated glass sheet such that the heated glass sheet is bent along the conveying direction and the perpendicular direction in accordance with the curvatures retrieved.

* * * * *